UNITED STATES PATENT OFFICE.

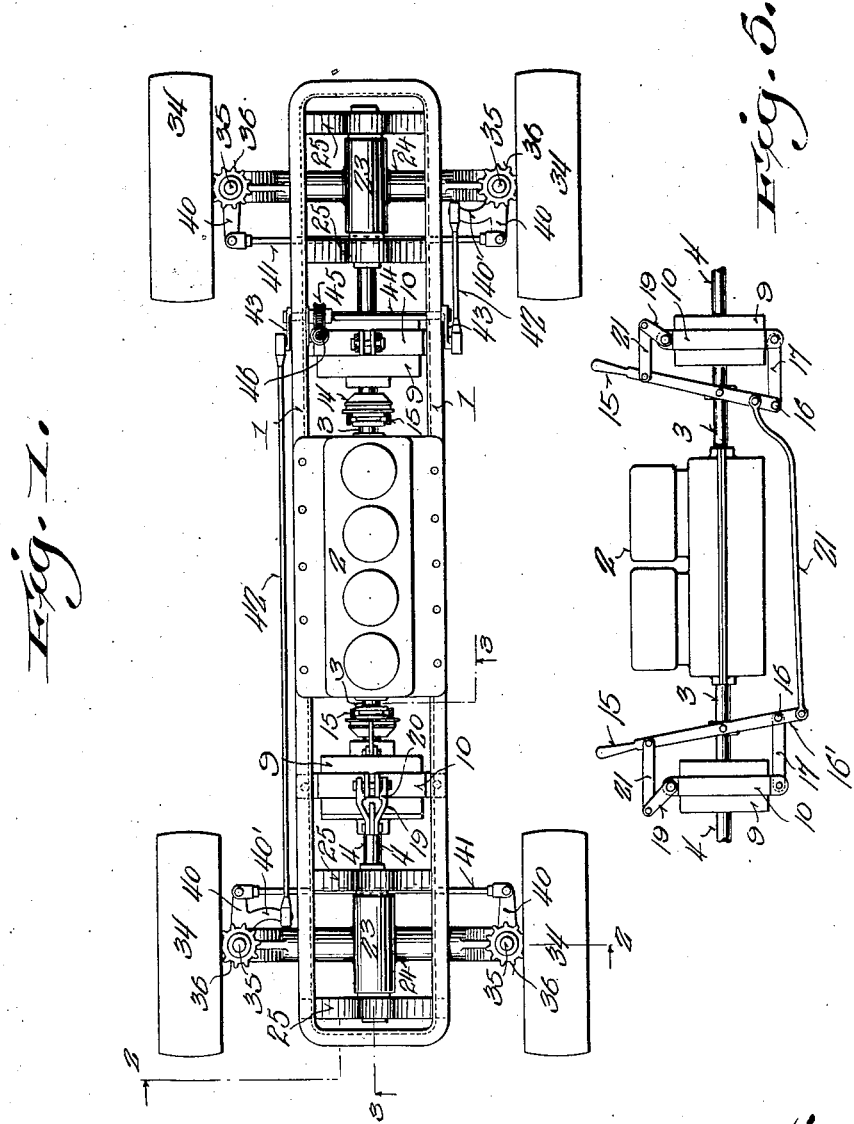

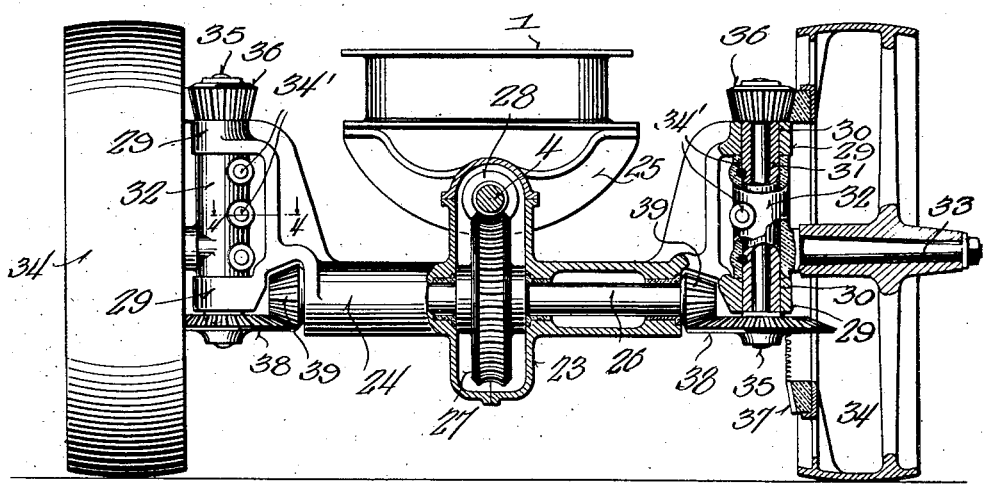

DAVID S. STEWART, OF ANTIGO, WISCONSIN, ASSIGNOR TO ANTIGO TRACTOR CO., OF ANTIGO, WISCONSIN, A CORPORATION OF WISCONSIN.

FOUR-WHEEL DRIVE-TRACTOR.

1,332,579.  Specification of Letters Patent.  Patented Mar. 2, 1920.

Application filed October 22, 1918. Serial No. 259,166.

*To all whom it may concern:*

Be it known that I, DAVID S. STEWART, a citizen of the United States, and resident of Antigo, in the county of Langlade and State of Wisconsin, have invented certain new and useful Improvements in Four-Wheel Drive-Tractors; and I do hereby declare that the following is a full, clear, and exact description thereof.

My invention relates to certain new and useful improvements in heavy duty motor-driven trucks or tractors, and has for its primary object to provide a simple, durable and economical truck of the above character wherein the four wheels are positively driven through the medium of simple gear connections from the source of power.

Another object of the present invention is to provide a separate transmission mechanism for each set of traction wheels and to provide for simultaneously operating the transmission mechanisms, whereby jerky movements of the truck when being started are prevented.

A further object of the herein disclosed invention is to mount each traction wheel upon a steering knuckle having a pivotal connection with the axle of the truck and capable of being simultaneously operated to provide for the efficient steering of the truck.

A still further object of this invention is to provide a novel manner of coupling the traction wheels with the motor or source of power without interfering with the efficient operation of the steering knuckles and whereby an increased amount of power is obtained.

With the above and other objects in view which will appear as the description proceeds, my invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, in which:

Figure 1 represents a top plan view of a truck embodying the features of my invention with parts broken away and in section to more clearly illustrate minor details of construction.

Fig. 2 represents a view part in section and part in elevation and taken transversely through one end of the truck on the line 2—2 of Fig. 1.

Fig. 3 represents a longitudinal sectional view taken through one end of the truck on the line 3—3 of Fig. 1.

Fig. 4 represents a transverse sectional view taken through the sleeve of one of the steering knuckles on the line 4—4 of Fig. 2, and Fig. 5 represents a diagrammatic view of the driving engine and transmission mechanisms illustrating the manner of simultaneously controlling the operation of the transmission mechanisms.

Referring by characters to the drawings, 1, 1, represents the side sills of a rectangular main frame, to the intermediate portion of which is bolted an internal combustion engine or other suitable source of power 2, having its crank shaft extended both rearwardly and forwardly therefrom as at 3, and operatively connecting each end of said shaft with the drive shafts 4, 4, which extend longitudinally of the frame and toward each end thereof, are suitable transmission mechanisms, and, as the transmission mechanisms are of like construction, the description of one will suffice for all.

The transmission mechanism consists primarily of a sleeve 5 fixed to the shaft 3 and having an internally toothed drum 6 projecting over and spaced from the inner end of shaft 4, a sleeve 5' fixed to the inner end of shaft 4 and formed with gear teeth 6' in line with the teeth of drum 6, and idler gears 7, journaled on the stub shafts carried by a plate 8, connecting the gear 6' and 6 as best shown in Fig. 3. The plate 8 is carried by a drum 9 rotatably mounted about drum 6 and has secured therearound a suitable braking band 10 adapted to bind thereagainst to retain the same stationary as will be later described, and adjustably carried by said drum 9 is a clutch 11 adapted to be forced inwardly to engage a plate 12 keyed to the sleeve 5, by means of pivoted arms or links 13 coming into engagement with a cone shaped member 14 carried by the operating lever 15 pivoted at 16 to a link 17 having its other end fixed to a lug 18. The brake band 10 is operated by means of a pivoted lever 19 provided at its inner end with a cam surface 20 adapted to, upon operation, impinge against and draw together the free ends of the brake band 10, the lever 19 being connected to lever 15 by means of a link 21.

The transmission mechanism just described is of well known construction having one speed forward, and one speed reverse and constitutes no part of the present invention. When the lever 15 and parts connected therewith are in the position depicted in Fig. 3 the motor is connected up with shaft 4 to revolve the same forward, the drums 6 and 9 being connected by means of clutch 11 to drive shaft 4 direct, and when the lever 19 is in a position to the right of that depicted in Fig. 3, its shaft 4 is being driven reverse to shaft 3, the brake band retaining drum 9 from revolution, clutch 11 being free from plate 12 and drum 6 revolving sleeve 5' and with it shaft 4 by means of idler gears 7 as will be obvious.

In order to obtain the simultaneous operation of the two transmissions, one of the levers 15 has its lower end extended below pivot 16 as at 16' and has pivoted thereto a connecting rod or link 21 which has its other connected to the other operating lever 15 just above its pivot point 16 whereby the simultaneous operation of the respective levers will be procured as will be apparent to those skilled in the art to which an invention of this character appertains.

The shaft 4 extends toward the end of the main frame and is journaled in bearing sleeves 22 formed in an enlargement or housing 23 provided intermediate the ends of a hollow axle 24. The main frame is carried by downwardly bowed bracket bars 25 extending transversely between and secured to the side sills 1 of the main frame, said bars being provided centrally with bearings which receive the bearing sleeves 22, said sleeves being projected outwardly of the housing 23 to thus mount the bracket bars. Journaled in the hollow axle 24 is a shaft 26 having its ends extended beyond the ends thereof and carrying on its portion in the housing 23 a worm gear wheel 27 in mesh with a worm gear 28 formed on the portion of shaft 4 in said housing 23.

Each end of the axle 24 has formed thereon a pair of spaced ears 29 provided with vertically alined apertures 30 in which are journaled the bushings 31 carried by the vertical sleeves 32 of the steering knuckles provided with suitable stub axles 33 for journally mounting suitable traction wheels 34, the bushings 31 being retained in the sleeves 32 by means of suitable dowel or tapered pins 34' as best shown in Figs. 2 and 4.

Journaled in each bushing 31 is a vertical shaft 35 having its ends extended beyond the ends of the said bushing and mounted on the upper end of said shaft is a small beveled gear 36 in mesh with a ring or master gear 37 fixed to the traction wheel 34, and fixed to the lower end of said shaft 35 is a large beveled gear 38 meshing with a small beveled gear 39 fixed on the adjacent end of the shaft 26. Thus it will be seen that power is transmitted through shaft 4 to shaft 26 by means of gears 27 and 28 and to the traction wheels by means of gears 38 and 39, shaft 35 and gears 36 and 37.

As will be readily seen by reference to Fig. 2, the steering knuckles are free to move between ears 29 without interfering with the operation of the driving mechanism and that through this manner of connecting the wheels 34 with the drive shaft 4, a powerful gearing is provided which is such as to permit the use of the transmission mechanisms hereinbefore described.

As best shown in Fig. 1 each steering knuckle is provided with an arm 40, the opposed arms 40 being connected by means of a suitable rod 41 and one of the steering knuckles at each end of the truck being provided with a second arm 40' from which leads a suitable rod 42 connected to a crank 43 of a steering rod 44 provided with suitable operating gears 45 whereby the simultaneous steering of all four wheels is provided. As will be obvious the usual hand wheel, not shown, is generally connected with gears 45 but that if desired the same may be connected with the engine in a suitable manner and with suitable controlling means to provide for the operation thereof.

While in the present exemplification of my invention, I have illustrated the same as dispensing with the usual differential, it will be readily apparent that a suitable differential mechanism may be used without departing from the spirit of the invention.

I claim:

1. A truck including a frame, front and rear axle housings, a drive wheel mechanism carried by one of said housings, a pair of alined bushings carried by said axle housing and extending outwardly thereof, means for driving said wheel mechanism including a shaft extending longitudinally of the frame and traversing the housing and journaled in the bushings thereof, and a pair of pivot bearings carried by the adjacent end portion of the frame and mounted on the bushings of the adjacent axle housing, said axle unit being otherwise free from connection with the frame.

2. A tractor including an elongated main chassis, an engine mounted centrally of the chassis on the side sills thereof, a variable transmission mechanism mounted on the side sills of the chassis at each end of the engine, a clutch connection between the shaft of the engine and each transmission mechanism, a differential mechanism connected with each end of the chassis and including transverse wheel drive shafts, wheels driven by said shafts, and means for simultaneously operating said transmission mechanisms and clutch connections.

In testimony that I claim the foregoing I have hereunto set my hand at Antigo, in the county of Langlade and State of Wisconsin.

DAVID S. STEWART.